Nov. 13, 1934.  E. L. MATLOCK  1,980,869
AIRCRAFT CONSTRUCTION
Filed Dec. 26, 1933  4 Sheets-Sheet 1
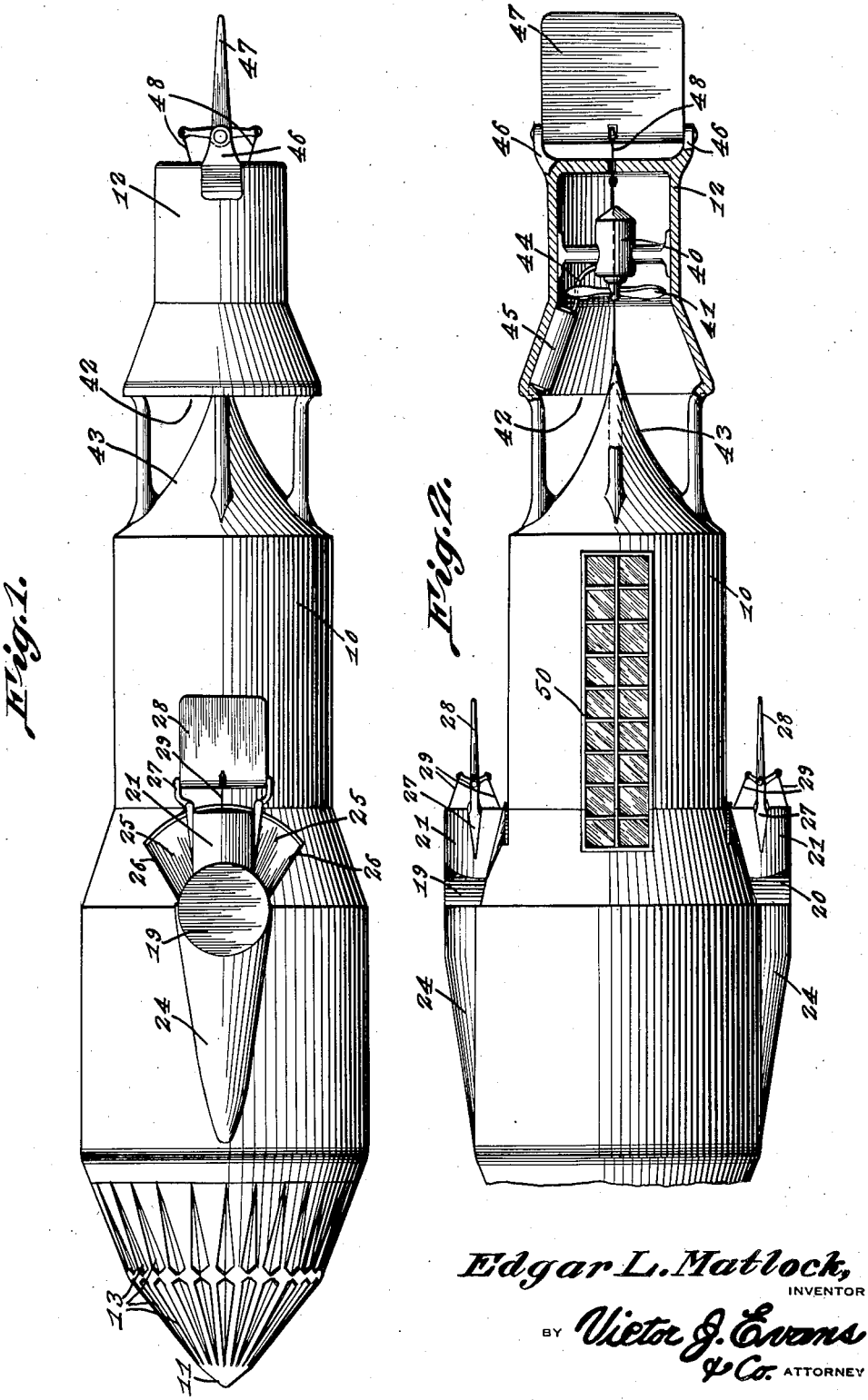
Edgar L. Matlock,
INVENTOR
BY Victor J. Evans & Co. ATTORNEY

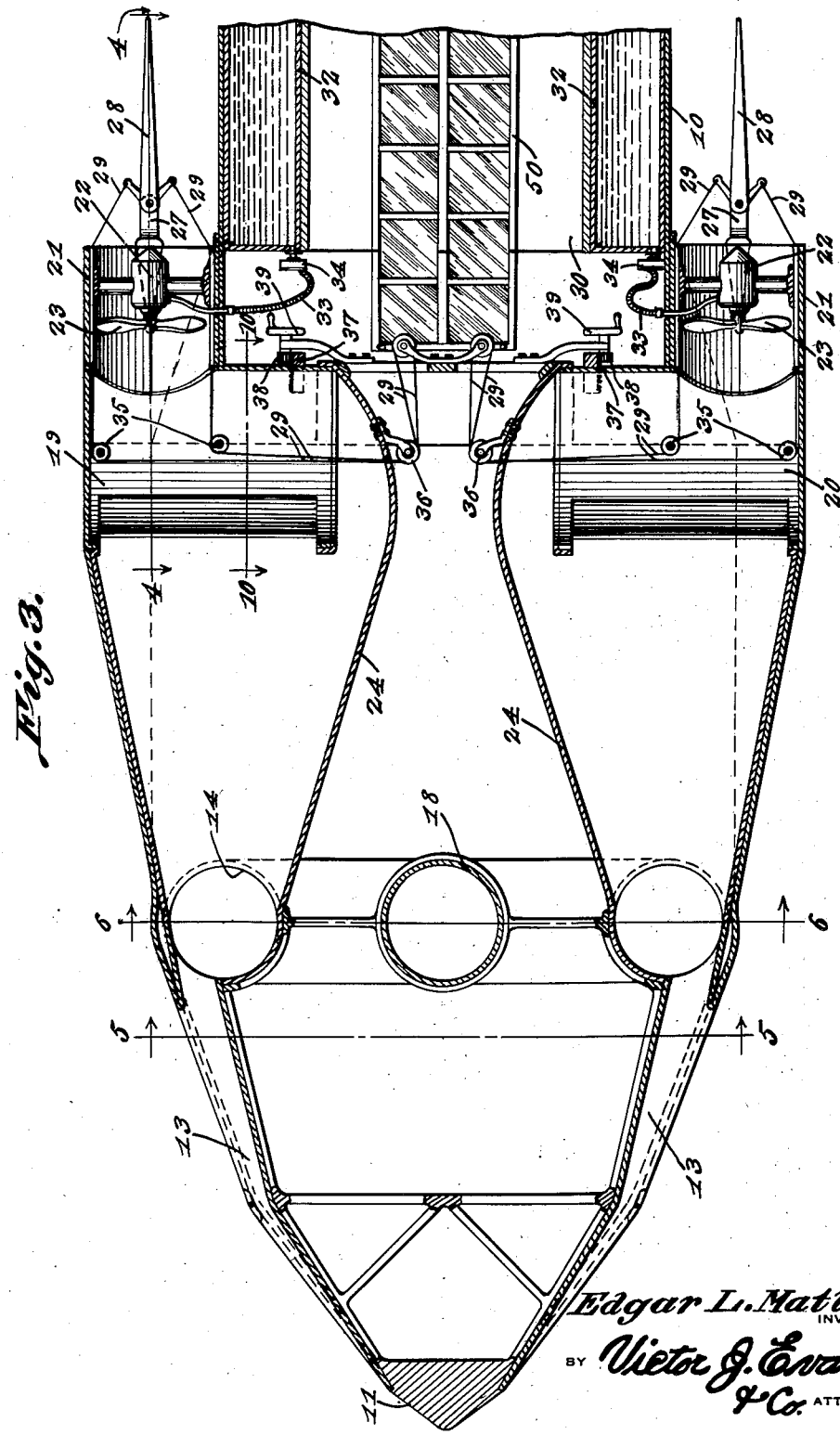

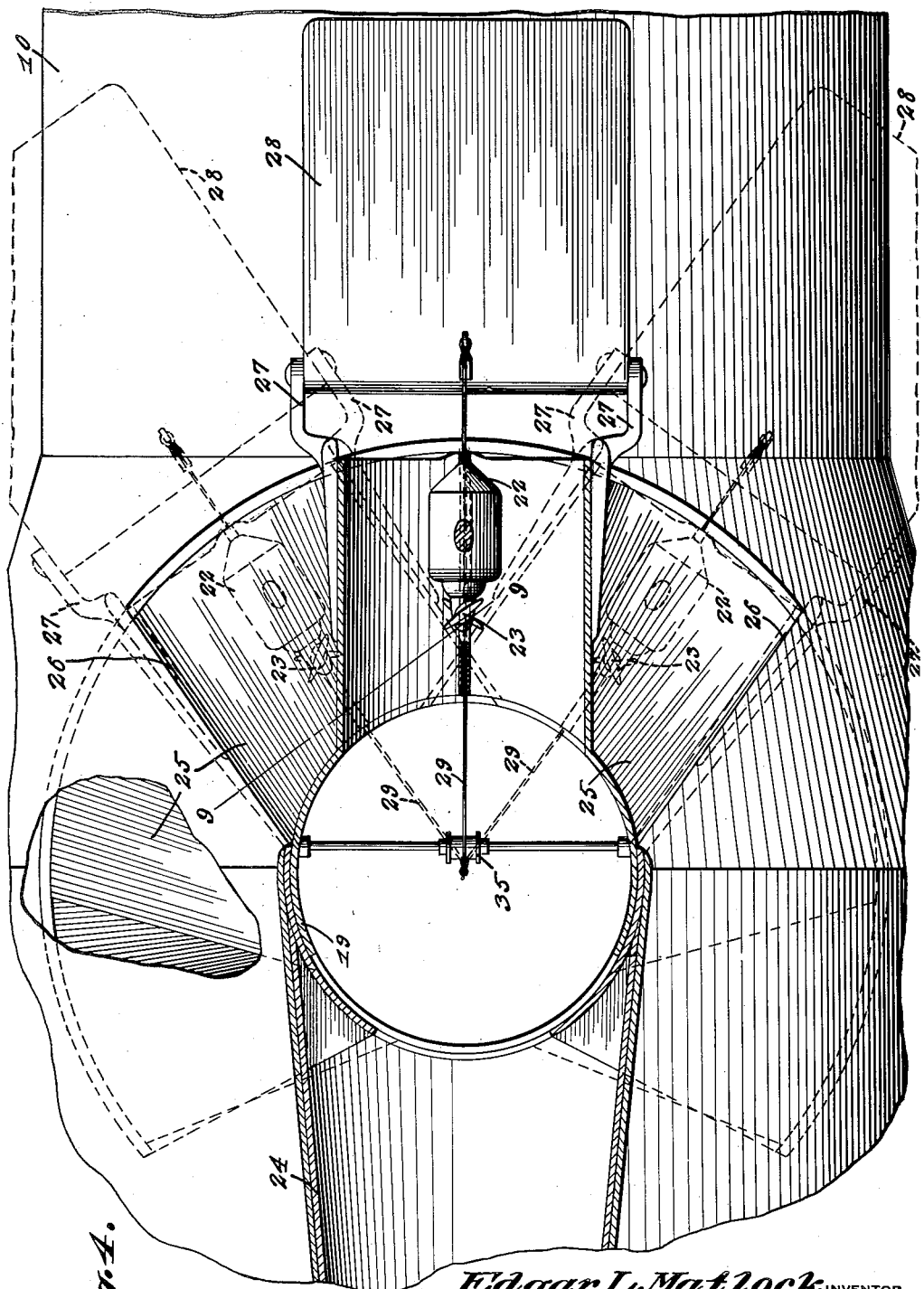

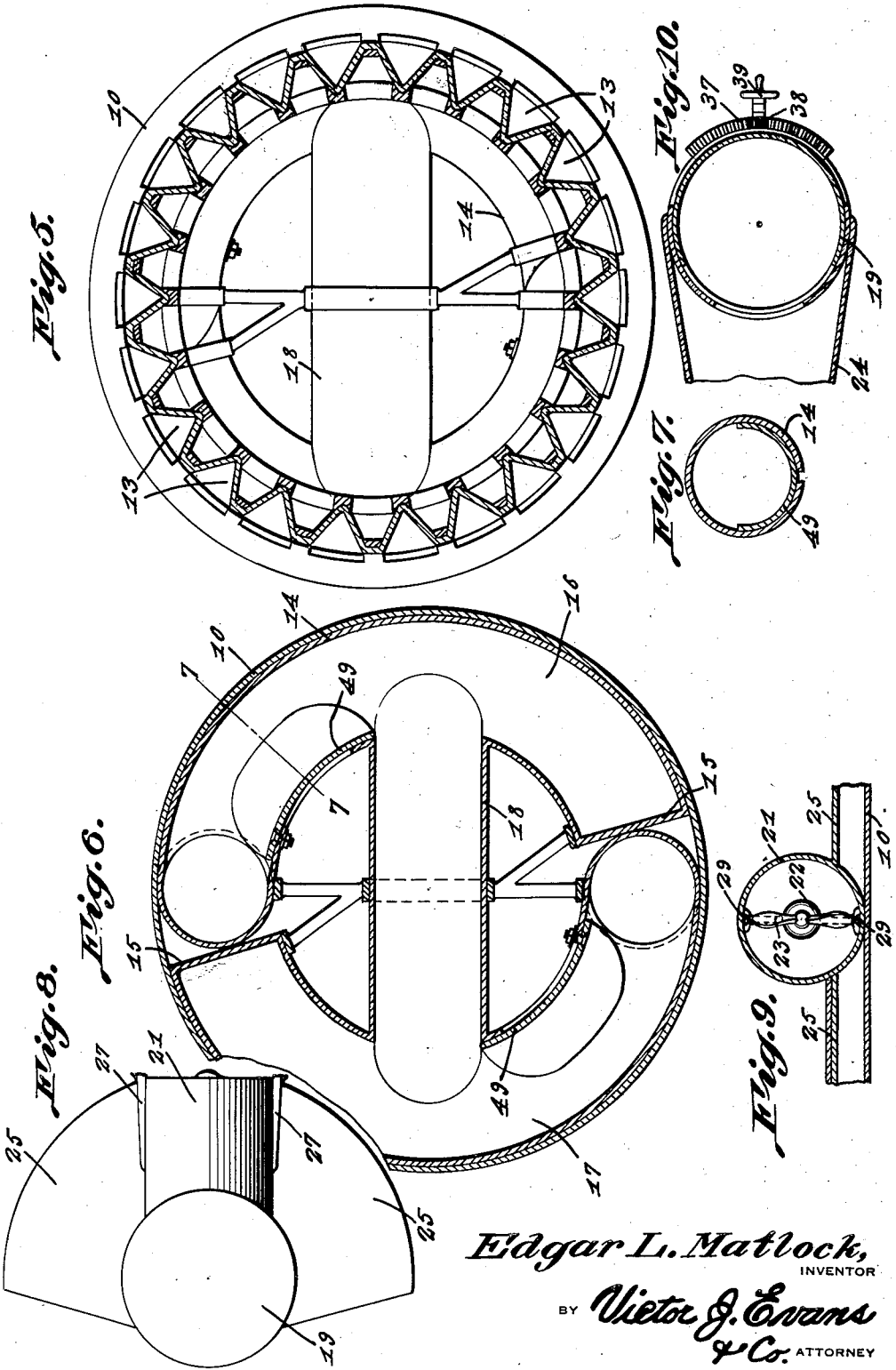

Patented Nov. 13, 1934

1,980,869

UNITED STATES PATENT OFFICE 1,980,869

AIRCRAFT CONSTRUCTION

Edgar L. Matlock, El Paso, Tex.

Application December 26, 1933, Serial No. 703,994

6 Claims. (Cl. 244—18)

The invention relates to an aircraft construction and more especially to that class known as streamline airplanes.

The primary object of the invention is the provision of aircraft of this character, wherein a vacuum drive will be had at the fore or nose end and a squeeze blast at the aft or tail end, with the fuselage maintaining a slender contour throughout the length of the craft, so that the latter can acquire maximum speed in flight, thus enabling the use of said craft for long distance travel in air transportation.

Another object of the invention is the provision of an aircraft of this character, wherein the propellers are located in air tubes or cylinders, the propellers at the fore part of the ship being susceptible of lateral swing to take care of side winds, and movable with the motors for said propellers are the elevators or lifts, these being controlled from within the ship, the latter in its entirety being of novel construction.

A further object of the invention is the provision of an aircraft of this character wherein the construction thereof assures a maximum efficiency and enables the ship to travel at high speed, there being fore and aft motors for propellers and these being confined within airways built in the fuselage, while the fore motors are susceptible of angular adjustment to confront the direction of the wind during the flight of the ship.

A still further object of the invention is the provision of an aircraft of this character which is comparatively simple in its construction, thoroughly reliable and efficient in its purpose, enabled to combat air conditions when the ship is in flight, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a top plan view of the aircraft constructed in accordance with the invention.

Figure 2 is a side elevation thereof.

Figure 3 is a fragmentary enlarged vertical longitudinal sectional view through the fore part of the craft.

Figure 4 is a sectional view on the line 4—4 of Figure 3.

Figure 5 is a sectional view on the line 5—5 of Figure 3, looking in the direction of the arrows.

Figure 6 is a sectional view on the line 6—6 of Figure 3, looking in the direction of the arrows.

Figure 7 is a fragmentary sectional view on the line 7—7 of Figure 6.

Figure 8 is a top plan view of one of the motor cylinders.

Figure 9 is a fragmentary sectional view on the line 9—9 of Figure 4.

Figure 10 is a sectional view on the line 10—10 of Figure 3, looking in the direction of the arrows.

Similar reference characters indicate corresponding parts throughout the several views in the drawings.

Referring to the drawings in detail, the aircraft constructed in accordance with the invention comprises a body 10, the external contour being streamlined, and this body constitutes the fuselage having a forwardly tapered nose 11 and a contracted circular tail end 12, the nose being also circular. Within the nose 11 and concentrically with respect thereto is a series of spaced forwardly converging air channels 13, these gradually diminishing in a forward direction and opening into a vertically disposed annular air tube 14 which in cross section is tubiform and transversely divided, as at 15, at diametrically opposite points below and above the longitudinal center of said fuselage so that there will be reverse air courses 16 and 17 within the said tube. Thus the channels 13 at one side of the vertical center of the nose 11 will be common to the course 16 and those at the other side will be common to the course 17 of this tube 14. These courses 16 and 17 are communicative one with the other through a by-pass 18 arranged horizontally in the fuselage.

Built into the fuselage and arranged rearwardly of the air tube 14, at the top and bottom of said fuselage, are turning air turrets 19 and 20, respectively, these having rearwardly extending cylinders 21 in which are fitted the motors 22 for the fore propellers 23, and leading to the turrets are the funnels 24 common to the respective courses 16 and 17. On opposite sides of each cylinder 21 are arranged laterally extending wings 25, these maintaining a closed condition to the opening 26 in the fuselage for the range of the swing of the cylinder 21 on the turning of its turret. Thus it will be apparent that each propeller 23 can take care of side winds in the course of the flight of the aircraft.

Carried by each cylinder 21 are hangers 27 for the mounting of vertically swinging elevators 28, these controlled by operating cables 29 accessible within the pilot's pit 30 interiorly of the fuselage.

The turrets 19 and 20 are provided with the front openings 31 for their communication with the funnels 24 and such openings are of an extent for the full communication of the turrets with the said funnels, irrespective of the swing of the cylinders 21.

Within the pit 30 are located the fuel tanks 32 which feed the fuel therefrom to the motors 22 by the feed pipes 33, each including a fuel pump 34, it being understood, of course, that the fuselage is cut away sufficiently for the movement of the feed pipes 33 without interference with the turning of the cylinders 21 carrying the motors 22.

The control cables 29 are trained over suitable guide pulleys 35 and 36, respectively, arranged within the turrets and the fuselage, respectively.

Each turret 19 and 20 carries a rack 37 meshing with a rack pinion 38 operated from a hand wheel 39, the latter being conveniently located within the pit 30 so that the said turret can be manually turned, as should be apparent from Figure 3 of the drawings.

The tail end 12 is of cylindrical form and has arranged therein a rear air blast motor 40 having the bladed fan wheel 41, and forwardly of the location of said motor are blast openings 42 in confronting relation to the fan wheel 41, the fuselage being formed at these openings 42 with a rearwardly tapered deflector formation 43. The motor 40, by the feed tube or pipe 44, receives its fuel supply from a fuel tank 45 arranged within the tail 12 of the aircraft.

The tail 12 has the bearings 46 for a rudder 47 which swings laterally and is controllable by the rudder cables 48, these being extended within the pit 30 convenient to the operator of the aircraft.

Suitably mounted for adjustment in any approved way in the tube 14 are shutters or cut-off valves 49 for the by-pass 18 at the point of communication thereof with the courses 16 and 17. Thus it can be seen that either propeller can be cut out for cooperative service with the other propeller at the fore part of the aircraft and when both propellers at said fore part of the aircraft are aiding each other this will enable the taking care of side winds relative to the course of the aircraft when in flight.

The pit 30, at each side thereof, is provided with observation windows 50.

It will be apparent that the aircraft when in flight, by the arrangement and the construction hereinbefore described, is susceptible of high speed of travel and is serviceable for long flights, and side winds can be taken care of during flight so as to avoid the ship being taken off its course in flight thereby.

It will be understood that the aircraft in its construction may include two, four or six forward blast tubes, the air supply being split up to pass through these tubes when the craft is in flight.

What is claimed is:

1. In an aircraft of the kind described, a body having a forwardly tapered nose and a contracted circular tail end, said nose concentrically thereof being provided with a series of spaced forwardly converging air channels, annular air tubes internally of the body, one of the air tubes being in communication with the air channels at one side of the vertical center of the nose and the other air tube with the other air channels at the other side of the vertical center of the nose, turning air turrets at the top and bottom of the body and each having a rearwardly extending cylinder, funnels between the said turrets and said air tubes, motor driven propellers fitted within said cylinders, a rudder arranged at the rear end of said body, lifting wings supported by said cylinders for vertical swinging movement, and means for turning the turrets.

2. In an aircraft of the kind described, a body having a forwardly tapered nose and a contracted circular tail end, said nose concentrically thereof being provided with a series of spaced forwardly converging air channels, annular air tubes internally of the body, one of the air tubes being in communication with the air channels at one side of the vertical center of the nose and the other air tube with the other air channels at the other side of the vertical center of the nose, turning air turrets at the top and bottom of the body and each having a rearwardly extending cylinder, funnels between the said turrets and said air tubes, motor driven propellers fitted within said cylinder, a rudder arranged at the rear end of said body, lifting wings supported by said cylinders for vertical swinging movement, means for turning the turrets, and controls for said lifting wings and rudder and located for operation within the body convenient to an attendant thereof.

3. In an aircraft of the kind described, a body having a forwardly tapered nose and a contracted circular tail end, said nose concentrically thereof being provided with a series of spaced forwardly converging air channels, annular air tubes internally of the body, one of the air tubes being in communication with the air channels at one side of the vertical center of the nose and the other air tube with the other air channels at the other side of the vertical center of the nose, turning air turrets at the top and bottom of the body and each having a rearwardly extending cylinder, funnels between the said turrets and said air tubes, motor driven propellers fitted within said cylinders, a rudder arranged at the rear end of said body, lifting wings supported by said cylinders for vertical swinging movement, means for turning the turrets, controls for said lifting wings and rudder and located for operation within the body convenient to an attendant thereof, and a rear motor driven propeller located within the tail end of said body.

4. In an aircraft of the kind described, a body having a forwardly tapered nose and a contracted circular tail end, said nose concentrically thereof being provided with a series of spaced forwardly converging air channels, annular air tubes internally of the body, one of the air tubes being in communication with the air channels at one side of the vertical center of the nose and the other air tube with the other air channels at the other side of the vertical center of the nose, turning air turrets at the top and bottom of the body and each having a rearwardly extending cylinder, funnels between the said turrets and said air tubes, motor driven propellers fitted within said cylinders, a rudder arranged at the rear end of said body, lifting wings supported by said cylinders for vertical swinging movement, means for turning the turrets, controls for said lifting wings and rudder and located for operation within the body convenient to an attendant thereof, and a rear motor driven propeller located within the tail end of said body, said body having blast openings in confronting relation to the rear end of the propeller.

5. In an aircraft of the kind described, a body having a forwardly tapered nose and a contracted circular tail end, said nose concentrically thereof being provided with a series of spaced forwardly converging air channels, annular air tubes internally of the body, one of the air tubes being in communication with the air channels at one side of the vertical center of the nose and the other air tube with the other air channels at the other side of the vertical center of the nose, turning air turrets at the top and bottom of the body and each having a rearwardly extending cylinder, funnels between the said turrets and said air tubes, motor driven propellers fitted within said cylinders, a rudder arranged at the rear end of said body, lifting wings supported by said cylinders for vertical swinging movement, means for turning the turrets, controls for said lifting wings and rudder and located for operation within the body convenient to an attendant thereof, a rear motor driven propeller located within the tail end of said body, said body having blast openings in confronting relation to the rear end of the propeller, and a rearwardly tapered deflector formation to the body immediately forwardly of the said blast openings.

6. In an aircraft of the kind described, a body having a forwardly tapered nose and a contracted circular tail end, said nose concentrically thereof being provided with a series of spaced forwardly converging air channels, annular air tubes internally of the body, one of the air tubes being in communication with the air channels at one side of the vertical center of the nose and the other air tube with the other air channels at the other side of the vertical center of the nose, turning air turrets at the top and bottom of the body and each having a rearwardly extending cylinder, funnels between the said turrets and said air tubes, motor driven propellers fitted within said cylinders, a rudder arranged at the rear end of said body, lifting wings supported by said cylinders for vertical swinging movement, means for turning the turrets, controls for said lifting wings and rudder and located for operation within the body convenient to an attendant thereof, a rear motor driven propeller located within the tail end of said body, said body having blast openings in confronting relation to the rear end of the propeller, a rearwardly tapered deflector formation to the body immediately forwardly of the said blast openings, and shutters arranged within the annular air tube for controlling the communication of the series of air channels therewith.

EDGAR L. MATLOCK.